UNITED STATES PATENT OFFICE.

FRANZ SOXHLET, OF MUNICH, BAVARIA, GERMANY.

REFINING AND CRYSTALLIZING STARCH-SUGAR.

SPECIFICATION forming part of Letters Patent No. 247,958, dated October 4, 1881.

Application filed May 10, 1881. (Specimens.)

*To all whom it may concern:*

Be it known that I, Prof. Dr. FRANZ SOXHLET, of Munich, in the Kingdom of Bavaria and Empire of Germany, have invented a certain new and useful Process in the Refining and Crystallization of Anhydrous Starch-Sugar, (Dextrose-Anhydride $C_6H_{12}O_6$,) and the production of the same with crystalline structure; and it consists in the following specification.

The production of such anhydrous and crystallized starch-sugar, ($C_6H_{12}O_6$,) which hitherto has never been made, is accomplished in the following manner:

Starch-sugar (glucose) solution is concentrated in vacuum until a sample is hardly kneadable when cool. The stiff sirup, heated not above 70° centigrade, (158° Fahrenheit,) is freely mixed in closed vessels with boiling-hot pure wood-spirit, (methyl-alcohol.) The quantity of the wood-spirit depends upon the purity of the starch-sugar (glucose) and also upon the expected quality of the product. In case ordinary starch-sugar (glucose) is used, which contains from twenty per cent. to thirty per cent. of substances not sugar, then take, to one hundred parts of the concentrated sirup, seventy to eighty parts of wood-spirit and allow it to crystallize in closed vessels at a temperature of 30° to 40° centigrade, (86° to 104° Fahrenheit.) The crystallization is hastened by the addition of some anhydrous crystalline starch sugar, (glucose.)

The granular mass can be separated by means of centrifugal power or suitable presses, and purified further by displacing or washing with wood-spirit.

Granulated porous starch-sugar, (glucose,) with clear, perfect, visible, and glittering crystals, having the appearance of refined cane-sugar, is produced in the following manner:

A clear and colorless starch-sugar (glucose) solution, freed as much as possible from foreign substances, is concentrated in vacuum to the above-mentioned consistence. The sirup must be perfectly clear, like water. If it be only a trifle cloudy, in consequence of the formation of crystals, which sometimes happens in consequence of a too slow or an interrupted evaporation, then such a sirup would be unsuitable for the following operation, owing to the production of hydrated crystals of the sugar. One mixes one hundred parts, by weight, of the sirup heated to about 70° centigrade, (158° Fahrenheit,) with ten to twenty-five parts, by weight, of boiling-hot pure methyl-alcohol, (wood-spirit,) until a thin sirup-like mass is obtained. Then the same is filled while still hot into conical molds. Afterward the same is slowly cooled down to 30° to 35° centigrade, (86° to 95° Fahrenheit,) and kept at this temperature until crystallization is complete. After two or three days the remaining fluid is drawn off. In case the sugar is wanted thicker and more solid, the remaining fluid is drawn off, and the porous mass is saturated once or twice with a mixture of one hundred parts of thick sirup and eighty to one hundred parts of wood-spirit. This operation, as well as the further crystallization, can be performed at common temperatures. When the desired density is obtained the fluid portions are sucked off and displaced with pure methyl-alcohol, of which five per cent. of the weight of the sugar is sufficient. Then the solid mass is taken out of the molds.

The methyl-alcohol is separated from the sugar by placing the loaf in a vacuum-pan with a well-cooled condenser. The methyl-alcohol is first distilled off at 35° centigrade, (95° Fahrenheit;) but after the distillation of the larger portion the temperature is gradually raised to 50° to 60° centigrade, (122° to 140° Fahrenheit.) If the sugar is kept for a few hours in vacuum at a temperature of 50° to 60° centigrade, (122° to 140° Fahrenheit,) then no more trace of the methyl-alcohol can be recognized either by taste or smell. From the drained-off portions the methyl-alcohol is reobtained by distilling in vacuum or in the ordinary way. The total loss of the methyl-alcohol is one-tenth, ($\frac{1}{10}$,) so that the real consumption of the same for the last-explained process amounts only to two per cent. to two and one-half per cent.

I claim—

The production of anhydrous crystalline starch-sugar (dextrose-anhydride $C_6H_{12}O_6$) by the crystallization of a mixture of starch-sugar (glucose) and wood-spirit at the above-mentioned temperature.

FRANZ SOXHLET.

Witnesses:
SAMUEL SPACKMAN,
EMIL HENZEL.